A. F. ROBBINS.
HOLDER FOR CHUCKS.
APPLICATION FILED APR. 16, 1915.

1,161,888. Patented Nov. 30, 1915.

Inventor:
Albert F. Robbins.
By his atty

UNITED STATES PATENT OFFICE.

ALBERT F. ROBBINS, OF WALTHAM, MASSACHUSETTS.

HOLDER FOR CHUCKS.

1,161,888.  Specification of Letters Patent.  Patented Nov. 30, 1915.

Application filed April 16, 1915.  Serial No. 21,778.

*To all whom it may concern:*

Be it known that I, ALBERT F. ROBBINS, a citizen of the United States, residing at Waltham, in the county of Middlesex and State of Massachusetts, have invented new and useful Improvements in Holders for Chucks, of which the following is a specification.

This invention relates to holders for chucks and more particularly to chucks such as are constructed and adapted for use in connection with watchmakers' lathes. In this type of lathe the chuck is arranged to be attached to the live spindle of the lathe only. It often becomes necessary however to attach a tool to the tail-spindle of such a lathe, but heretofore no provision has been made to do so, said tail-spindle being constructed merely to hold a dead center.

The object therefore of the present invention is to provide a neat, strong and conveniently operable holder for chucks constructed and arranged to hold drills and tools of various kinds, said holder being constructed and arranged to fit the tail-spindle of the lathe and to firmly maintain the tools held by the chuck therein in proper alinement with the work.

The invention consists in the combination and arrangement of parts whereby the above object and certain other objects hereinafter appearing may be attained, as set forth in the following specification and particularly pointed out in the claims.

Figure 1:
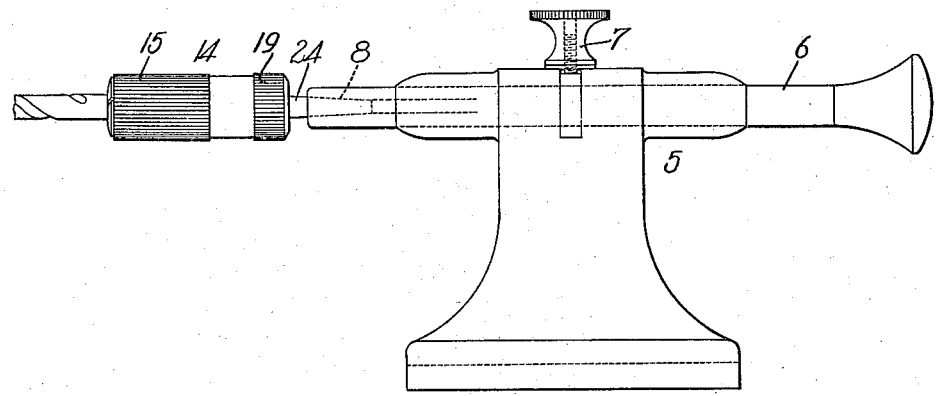
Figure 2:
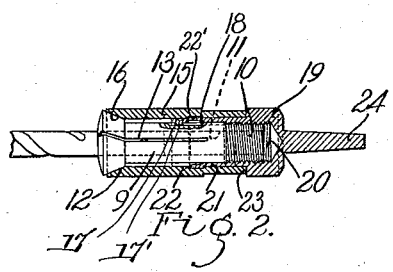
Figure 5:
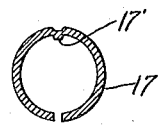
Figure 3:
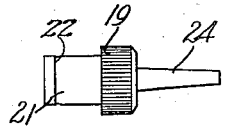
Figure 4:
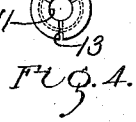
Figure 6:
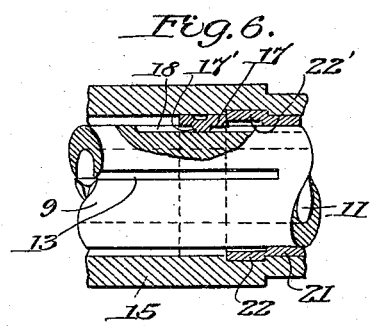

Referring to the drawings: Figure 1 is a side elevation of the tail-stock of a lathe with a chuck and chuck holder embodying my invention shown attached thereto. Fig. 2 is a longitudinal section through the holder illustrated in Fig. 1 with the chuck shown in elevation therein. Fig. 3 is a detail view of the supporting member of said holder showing the condition of the shoulder which maintains the supporting member in said holder, previous to its being expanded. Fig. 4 is a front elevation of the chuck. Fig. 5 is a sectional view of a split ring arranged to prevent the rotation of the clutch during the clamping of the same within the holder. Fig. 6 is an enlarged sectional view, similar to Fig. 2, illustrating the means for retaining the two portions of the chuck holder in rotatable relation to each other.

Like numerals refer to like parts throughout the several views of the drawings.

In the drawings, 5 is the tail-stock of a watchmaker's lathe; 6 a tail-spindle constructed and arranged to be moved longitudinally and rotatably relatively to said tail-stock or to be clamped in the desired position therein by a clamping device 7. The spindle 6 is provided with a tapered recess 8 in the forward end thereof adapted to receive and hold the usual center. The chucks for this type of lathe are usually mounted in the live spindle to which a rotary motion is imparted by the usual and well known instrumentalities.

The construction of the chucks referred to is well known to those skilled in the art and comprises a cylindrical body portion 9 having at one end a screw-threaded portion 10, while the opposite end of said chuck is split preferably at three places, as shown at 13, 13 Fig. 4 and for a substantial portion of the length of said body. Said chuck is also provided with a hole 11 extending therethrough, the diameter of said hole varying in the different chucks to fit drills and tools of different diameters. The split end of said chuck is also enlarged and provided with a male cone 12.

It is often desirable in certain kinds of work to attach the chuck hereinbefore described to the tail-spindle of the lathe, although no means have heretofore been known whereby said chuck may be firmly attached to the tail-spindle. To accomplish this desirable and advantageous result a holder 14 has been provided to receive and hold said chuck, which holder embodies in its construction a sleeve 15 arranged to surround the conical split end and body portion thereof. The mouth of said sleeve is coned at 16 to correspond with and engage the male cone portion 12 of said chuck.

A split ring 17 is arranged within said sleeve 15 and is yieldingly held in frictional contact with said sleeve in the desired position therein by the resiliency of said ring. A projection 17' is formed on said ring, preferably by offsetting a portion of the material thereof. The projection 17' engages said chuck within a slot 18 arranged longitudinally of the body portion 9 of said chuck, thus overcoming any normal tendency to rotate said sleeve on said chuck.

The member 15 constitutes a relatively stationary member. Another member, or more strictly speaking, a socket 19 constituting a relatively movable portion of the holder 14 is provided with screw threads 20 on the interior thereof which engage the screw threaded portion of said chuck and upon the rotation of said socket, said chuck will be caused to move longitudinally of said sleeve and the split end thereof expanded or contracted by the coöperating cones thereof and said sleeve.

The socket 19 has formed thereon an annular rim 21 adapted to fit into the sleeve 15. The outer end of said rim is provided with an annular shoulder 22 which is formed by expanding said outer end of said rim after the same has been inserted into the sleeve 15. Said shoulder is expanded into an annular recess 22' formed within the sleeve 15. The purpose of said annular shoulder 22 is to prevent the withdrawal of the socket from the sleeve, but is constructed and arranged to permit said members to be rotated relatively to each other during the expansion and contraction of the chuck. The rim 21 has a bore which fits the body portion 9 of said chuck and constitutes a support for said chuck. An annular shoulder 23 formed upon the socket 19 engages the rear end of the sleeve 15 and this shoulder coöperates with the shoulder formed by expanding the outer end of the annular rim 21 in preventing any longitudinal relative movements between the members of said holder.

A tapered shank 24 is provided on the socket 19, which shank is adapted to fit the tapered recess 8 within the tail-spindle 6, thus maintaining the axis of the chuck coincident with the axes of the tail-spindle and the live spindle of the lathe. The outer peripheries of the two sections 15 and 19 of said holder are knurled to permit the same to be more easily moved relatively to each other in contracting and expanding the jaws of the chuck.

Having thus described my invention what I claim and desire by Letters Patent to secure is:

1. The combination with a chuck having a screwthreaded end and a split cone end, of a holder for said chuck embodying in its construction a relatively stationary member having a cone mouth adapted to receive and fit the split cone of said chuck and a relatively movable member adapted to fit said stationary member, said movable member having an internally screwthreaded portion adapted to engage the screwthreaded portion of said chuck and to be moved relatively to said stationary portion to draw said chuck into the mouth of said stationary member and contract said chuck, a rim on said movable member constructed and arranged to embrace the body portion of said chuck, and means on said movable member adapted to support said holder.

2. The combination with a lathe spindle provided with a tapered recess at one end thereof of a chuck having a split male cone at one end thereof, the opposite end of said chuck being screwthreaded, a sleeve adapted to surround said chuck, said sleeve having a cone mouth adapted to correspond with and engage the split cone of said chuck, means to prevent the rotation of said chuck within said sleeve, a socket, screwthreads within said socket adapted to engage the threads on said chuck, said socket being adapted to be rotated relatively to said sleeve to move said chuck longitudinally thereof, an annular rim on said socket adapted to surround and embrace the body portion of said chuck and protrude into said sleeve, and a tapered shank formed on said socket constructed and arranged to support said socket within said lathe spindle.

3. The combination with a chuck having a split cone at one end thereof, the opposite end of said chuck being screwthreaded, a sleeve adapted to receive said chuck, said sleeve having a cone mouth adapted to correspond with and engage the split cone of said chuck, means to prevent the rotation of said chuck within said sleeve, a socket, screwthreads within said socket adapted to engage the threads on said chuck, said socket being constructed and arranged to rotate relatively to said sleeve to move said chuck longitudinally of said sleeve, an annular rim on said socket adapted to surround and embrace the body portion of said chuck and to protrude into said sleeve, an annular shoulder formed integral with and constructed and arranged to retain said socket in rotatable engagement with said sleeve, and a tapered shank formed on said socket.

4. The combination with a chuck having a split cone at one end thereof, the opposite end of said chuck being screwthreaded, a sleeve adapted to receive said chuck, said sleeve having a cone mouth adapted to correspond with and engage the split cone of said chuck, means to prevent the rotation of said chuck within said sleeve, a socket, screwthreads within said socket adapted to engage the threads on said chuck, said socket being constructed and arranged to rotate relatively to said sleeve to move said chuck longitudinally of said sleeve, an annular rim on said socket adapted to surround the body portion of said chuck and to protrude into said sleeve, an annular shoulder formed at the end of said annular rim integral therewith and adapted to fit an annular recess formed within said sleeve and to prevent a longitudinal movement of said socket relatively to said sleeve, and means for supporting said socket.

5. The combination with a chuck having a screwthreaded end and a split end, of a holder for said chuck embodying in its construction a sleeve adapted to receive and fit the split end of said chuck, a split ring adapted to yieldingly and frictionally engage the inner surface of said sleeve, said split ring having a projection therein adapted to enter a slot formed in said chuck and to prevent the rotation of said chuck within said sleeve, and a socket having an annular rim formed thereon adapted to surround a portion of said chuck and to protrude into said sleeve and in rotatable engagement therewith, and means constructed and arranged to support said socket.

In testimony whereof I have hereunto set my hand in presence of two subscribing witnesses.

ALBERT F. ROBBINS.

Witnesses:
 CHARLES S. GOODING,
 SYDNEY E. TAFT.

Copies of this patent may be obtained for five cents each, by addressing the "Commissioner of Patents, Washington, D. C."